(12) United States Patent
Kursawe et al.

(10) Patent No.: US 9,268,918 B2
(45) Date of Patent: Feb. 23, 2016

(54) ENCRYPTION AND DECRYPTION OF A DATASET IN AT LEAST TWO DIMENSIONS

(75) Inventors: Klaus Kursawe, Eindhoven (NL); Timothy Kerins, Eindhoven (NL)

(73) Assignee: NXP, B.V., Eindhoven (NL)

( * ) Notice: Subject to any disclaimer, the term of this patent is extended or adjusted under 35 U.S.C. 154(b) by 1620 days.

(21) Appl. No.: 12/529,796

(22) PCT Filed: Mar. 11, 2008

(86) PCT No.: PCT/IB2008/050877
§ 371 (c)(1),
(2), (4) Date: Jan. 27, 2010

(87) PCT Pub. No.: WO2008/110985
PCT Pub. Date: Sep. 18, 2008

(65) Prior Publication Data
US 2010/0138669 A1    Jun. 3, 2010

(30) Foreign Application Priority Data
Mar. 13, 2007    (EP) .................................... 07005136

(51) Int. Cl.
*H04L 29/00* (2006.01)
*G06F 21/10* (2013.01)
(Continued)

(52) U.S. Cl.
CPC ................ *G06F 21/10* (2013.01); *G06F 21/60* (2013.01); *G06F 21/62* (2013.01); *H04L 9/065* (2013.01);
(Continued)

(58) Field of Classification Search
CPC .................. G06F 2211/007; G06F 2221/2107; H04W 12/04
USPC .......... 713/189–194, 164–167; 380/255–263, 380/28–29
See application file for complete search history.

(56) References Cited

U.S. PATENT DOCUMENTS 6,711,683 B1    3/2004    Laczko, Sr. et al.
6,782,101 B1 *  8/2004    Huntress ............... G06T 1/0021
                                                     380/28
(Continued)

FOREIGN PATENT DOCUMENTS

CN    1770680 A    5/2006
EP    1378809 A    1/2004
(Continued)

OTHER PUBLICATIONS

Hanping, Hu; et al; "Image Watermarking Technique Based on Two-Dimensional Chaotic Stream Encryption"; Embedded and Ubiquitious Computing Lecture Notes in Computer Science; LNCS, Springer-Verlag, BE; vol. 3823; Jan. 1, 2005; p. 817-824; XP019025487; ISBN: 978-3-540-30803-4.
(Continued)

*Primary Examiner* — Madhuri Herzog (57) ABSTRACT

It is described a method for encrypting and a method for decrypting at least a portion (155) of a dataset being stored in a memory (150), wherein the dataset has at least two dimensions. The described multi-dimensional cryptographic methods comprise forming a first keystream (165) being assigned to a first dimension of the dataset and forming a second keystream (175) being assigned to a second dimension of the dataset. The encrypting method further comprises encrypting each data packet of the portion (155) of the dataset by using a combination of the first keystream (165) and the second keystream (175). The decrypting method further comprises decrypting each data packet of the portion (155) of the dataset by using a combination of the first keystream (165) and the second keystream (175). It is further described a method for temporarily storing at least a portion (155) of a dataset into a memory (150) and a device for handling a dataset, which method and which device take advantage of the above-described encrypting method and/or the above-described decrypting method.

20 Claims, 3 Drawing Sheets

(51) Int. Cl.
*H04L 9/08* (2006.01)
*G06F 21/62* (2013.01)
*G06F 21/60* (2013.01)
*H04L 9/06* (2006.01)
*H04L 29/06* (2006.01)

(52) U.S. Cl.
CPC ............ *H04L 9/0618* (2013.01); *H04L 9/0861* (2013.01); *H04L 63/0435* (2013.01); *H04L 63/0457* (2013.01); *G06F 2211/007* (2013.01); *G06F 2221/2107* (2013.01); *H04L 63/0428* (2013.01)

(56) References Cited

U.S. PATENT DOCUMENTS 7,206,940 B2 * 4/2007 Evans et al. .................. 713/193
2003/0135742 A1 7/2003 Evans
2010/0014669 A1 * 1/2010 Jiang ........................... 380/255

FOREIGN PATENT DOCUMENTS

WO 03048939 A1 12/2003
WO 2005005197 A 1/2005

OTHER PUBLICATIONS

Abdel-Gaward, M.A., et al; "2D Encryption Mode"; Proceedings of SPIE; vol. 4793; 2003; pp. 64-75; XP002490513.

Chen Yong-Qiang et al, "Digital Image Stream Encrypting Algorithm Based on Two-Dimensional Logistic Chaotic Map"; School of Computer Science of Wuhan University of Science and Engineering, Wuhan 430073; Institute for Pattern Recognition and Artificial Intelligence of Huazhong University of Science and Technology, Wuhon 430074 pp. 224-227.

* cited by examiner

ENCRYPTION AND DECRYPTION OF A DATASET IN AT LEAST TWO DIMENSIONS

FIELD

The present invention relates to the field of cryptography. In particular, the present invention elates to a method for encrypting and to a method for decrypting at least a portion of a dataset being stored in a memory, wherein the dataset has at least two dimensions.

Further, the present invention relates to a method for temporarily storing at least a portion of a dataset into a memory, wherein for storing an encrypting method as described above is used and/or for retrieving the portion of the dataset from the memory an decrypting method as described above is used. Furthermore, the present invention relates to a device for handling a dataset having at least two dimensions, wherein the portion of the dataset is transferred from a processing device to a memory by using an encryption method as described above and/or wherein the portion of the dataset is transferred from the memory to the processing device by using a decryption method as described above.

BACKGROUND

Encryption of compressed multimedia content is an increasingly common requirement by the content industry and is a requirement to comply with various robustness rules in Digital Rights Management (DRM) standards. A general rule of thumb is that in order to effectively prevent an unauthorized copying of media contents such as for instance a High Definition (HD) video, the media content must not be stored in memories in an electronic device without also being encrypted.

One problem for current encryption schemes is that known rendering engines do not access memories in a linear pattern. Rather, the frame store represents a two-dimensional (2D) picture, and a rendered object may move freely within this frame. Known decryption methods based on block ciphers and stream ciphers do not easily handle accesses of this type or arbitrary size and position in a larger 2D block of encrypted content. In the case of HD graphics for example, the frame store is of the order 1920×1080×32 bits. It is apparent that it is impractical to decrypt a frame store of this size in order just for obtaining a much smaller data content section for processing.

An additional problem to make memory encryption hard is that one must not add a significant latency to memory read operations. Any complex operations during encryption may upset the timing of the platform and render the encryption scheme useless for a user.

WO 03/048939 discloses a method for cryptographically protecting secure content in connection with a graphics subsystem of a computing device. Techniques are implemented to encrypt the contents of video memory so that unauthorized software cannot gain meaningful access to it, thereby maintaining confidentiality. Moreover, a mechanism for tamper detection is provided so that there is awareness when data has been altered in some fashion, thereby maintaining integrity. In various embodiments, the contents of overlay surfaces and/or command buffers are encrypted, and/or a graphic processing unit is able to operate on encrypted content while preventing its availability to untrusted parties, devices or software.

US 2003/0135742 discloses a method and a system for protecting data that is intended for use and processed on video or graphics cards. In various embodiments, data that is intended for use by a video card can be encrypted such that any time the data is provided onto a bus between the video card and the computer system. For example, when data is moved from memory on the video card to the system's memory and vice versa, the data is in encrypted form and thus protected.

U.S. Pat. No. 6,711,683 discloses a computing system that prevents unauthorized use of compressed video data stored in a first-in-first-out memory buffer of a set top box. A single integrated circuit includes a data processor and a chip identity read only register storing a unique chip identity number fixed during manufacture. The data processor encrypts the compressed video data stream using the chip identity number as an encryption key. This encrypted data is stored in and recalled from a First In-First Out (FIFO) buffer. The data processor then decrypts the recalled data employing at least a part of the chip identity number as the decryption key. Using this technique the compressed video data stream temporarily stored in compressed form in the FIFO buffer can only be employed by the particular data processor having the unique chip identity number.

There may be a need for providing an advanced encryption and decryption scheme, which is in particular effective for data contents comprising a two dimensional structure.

OBJECT AND SUMMARY

This need may be met by the subject matter according to the independent claims. Advantageous embodiments of the present invention are described by the dependent claims.

According to a first aspect of the invention there is provided a method for encrypting at least a portion of a dataset being stored in a memory, wherein the dataset has at least two dimensions. The provided method comprises (a) forming a first keystream being assigned to a first dimension of the dataset, (b) forming a second keystream being assigned to a second dimension of the dataset, and (c) encrypting each data packet of the portion of the dataset by using a combination of the first keystream and the second keystream.

This first aspect of the invention is based on the idea that the known method of one-dimensional stream cipher encryption can be further developed by taking into account the dimensionality of the dataset, which stores the at least two-dimensional (2D) dataset. Thereby, the portion of the dataset is encrypted independently by carrying out (a) a first stream cipher encryption along a first direction of the dataset and (b) a second stream cipher encryption along a second direction of the dataset. Each direction represents one dimension of the dataset.

It has to be pointed out that the described method is not limited for encrypting a 2D dataset. Since the method relies on an independent encryption along different directions in principle datasets having an arbitrary high dimensionality can be encrypted. In particular three-dimensional (3D) datasets representing either 3D images of a temporal sequence of 2D images can also be effectively encrypted by applying the described method. Further, also four-dimensional (4D) datasets, which may for instance represent a temporal sequence of 3D images can be encrypted in an effective and reliable manner.

In this respect it has to be emphasized that it is not necessary that the dimensionality of the dataset directly reflects the physical structure of the memory, such as the spatial arrangement of individual memory cells defining the memory. This means that the dataset may be interpreted as a mathematical matrix having an arbitrary dimensionality greater then one.

Preferably, the combination of the two keystreams is carried out in such a manner that the result of the encryption does not depend on the sequence of the combination. This means that the encryption of a specific data packet within the dataset portion is the same independent whether the encryption is carried out first along the first direction and second along the second direction or vice versa first along the second directions and second along the first direction. Further, the encryption of a specific data packet within the dataset portion should be also the same if different stepwise encryptions along the different directions are carried out. This means that before encrypting the specific data packet an encryption of other data packets has been carried out by means of a sequence of different encryption procedures, which sequence represents an encryption along alternating directions.

The described method may provide the advantage that when only a selected portion of the encrypted multi-dimensional dataset has to be decrypted, it is no more necessary to decrypt the whole dataset or an overly large part thereof. Such a complete decryption would be necessary, if a known one-dimensional stream cipher encryption or block cipher encryption would have been used for encrypting the dataset. By using the described multi-dimensional stream cipher encryption it is possible to obtain a comparatively quick access to the encrypted data packets being assigned to the selected portion of the dataset. The quick access is possible because when originating from a predefined starting data packet of the dataset by using an appropriate combination of sequentially decrypting neighboring data packets along different directions the encrypted data packets of the selected portion of the dataset can be decrypted within a comparatively short time span after the decryption procedure has been started. By contrast to a known one-dimensional stream cipher decryption it is therefore no more necessary to sequentially decrypt neighboring data packets along a predefined line covering the whole encrypted 2D dataset. For encrypted 2D datasets this line may be for instance a meander line.

Descriptive speaking this means that by using the defined multi-dimensional encryption method for encrypting the data content stored in a memory, for decryption the regions of decryption can be effectively aligned with a specific portion of memory required for decryption. Therefore, the unnecessary decryption of data content, which is not needed by a user, can be significantly reduced. As a consequence, compared to known encryption and corresponding decryption procedures the described multi-dimensional encryption method allows for a much faster decryption of specific portions of the memory.

The described method may be applied for instance for 2D datasets representing frames of a video clip or a movie. The described method may allow for effectively and quickly decrypt certain frame portions even if the corresponding 2D dataset is only stored intermediately in a known frame buffer.

According to an embodiment of the invention (a) the first keystream is generated based on a first stream cipher and (b) the second keystream is generated based on a second stream cipher.

The generation of the respective keystreams may be carried out in an iterative manner, whereby for one iteration exactly one data packet of the respective keystream is generated. Such a data packet wise generation may be based in a known manner on the knowledge of an internal state of the respective stream cipher, which comprises an update function, a keystream generation function and a cipher key.

The above-described independency of the encryption result from the specific way the two keystreams are combined with each other in order to address a specific bit of the dataset will be realized automatically when the first stream cipher and the second stream cipher are independent from each other. This means that moving the first keystream forward has no influence on the second stream cipher such that the way the two keystreams are combined has not influence on the encryption result.

According to a further embodiment of the invention (a) the first stream cipher and the second stream cipher are identical and (b) for generating the first keystream a first key is used and for generating the second keystream a second key being different from the first keystream is used. This may provide the advantage that for carrying out the described multi-dimensional encryption method simply one stream cipher is necessary. This means that, when a frequent re-keying of the stream ciphers is carried out for instance in order to increase the security level of the described multi-dimensional encryption method, for each re-keying procedure only one stream cipher has to be produced.

By contrast to methods, wherein for each re-keying procedure a number of stream ciphers has to be generated, which number corresponds to the dimensionality of the dataset, the effort for the overall stream cipher production can be reduced significantly.

According to a further embodiment of the invention, the first keystream and/or the second keystream comprises a recurring code. The usage of a recurring code may provide the advantage that the described multi-dimensional encryption method can be used for all datasets independent of the size of the datasets. In other words, independent of the size of the keystreams and the size of the memory, the whole memory space can be uniquely covered by the combination of the at least two keystreams at each memory location. An internal storage of internal states of the stream ciphers having a predefined storage space is sufficient in order to perform the described multi-dimensional encryption method for a memory having an arbitrary size.

According to a further embodiment of the invention, the first keystream and the second keystream depend on each, other. This means that an output of one of the two keystreams depends on both the corresponding stream ciphers and on the state of the other of the two keystreams. In other words, the two stream ciphers have a shared state and moving the keystream will update the state relevant for both ciphers.

According to a further embodiment of the invention, the combination of the first keystream and the second keystream comprises an XOR-operation between a bit of the first keystream and a bit of the second keystream. Thereby, the respective number depends on the position of the data packet of the plaintext within the multi-dimensional dataset, which plaintext data packet is supposed to be encrypted.

The usage of an exclusive OR-operation may provide the advantage that the described multi-dimensional encryption method is symmetric. This means that for decrypting a data packet from the encrypted dataset the same combination of the first keystream and the second keystream can be used, which combination was also used for encrypting this data packet.

According to a further embodiment of the invention, (a) the data packet has the size of a single bit and (b) encrypting each bit of the portion of the dataset comprises performing an XOR-operation between a bit of the dataset and a corresponding bit of the combined first and second keystream. This may provide the advantage the described multi-dimensional encryption method may be not only symmetrical with respect to a combination of the first keystream and the second keystream. The encryption method can also be symmetric with respect to the decryption of each bit of the encrypted dataset.

According to a further embodiment of the invention, the data packet has the size greater than a single bit. This means that the described multi-dimensional encryption is carried out with stream ciphers operating at a granularity greater than a single bit. This may provide the advantage that encryption procedure can be carried out on a packet basis, wherein depending on the respective application each packet has an appropriate size. For instance for encrypting video data a pixel based packaging might be appropriate, wherein depending on the desired color-resolution of one pixel each packet may have a more or less large size. For a pretty high color resolution 32 bit seem to be appropriate.

According to a further aspect of the invention, there is provided a method for decrypting at least a portion of a dataset being stored in a memory, wherein the dataset has at least two dimensions. The provided method comprises (a) forming a first keystream being assigned to a first dimension of the dataset, (b) forming a second keystream being assigned to a second dimension of the dataset, and (c) decrypting each bit of the portion of the dataset by using a combination of the first keystream and the second keystream.

This aspect of the invention is based on the idea that the known method of one-dimensional stream cipher decryption can be further developed by taking into account the dimensionality of the dataset, which stores the at least two-dimensional (2D) dataset. Thereby, the portion of the dataset is decrypted independently by carrying out (a) a first stream cipher decryption along a first direction of the dataset and (b) a second stream cipher decryption along a second direction of the dataset. Each direction represents one dimension of the dataset.

Further embodiments of the described multi-dimensional decrypting method are given by incorporating one or more limitations associated with the above-described embodiments of the multi-dimensional encrypting method. Therefore, in order to avoid unnecessary repetitions reference is made to the corresponding description given above of embodiments of the described encrypting method. In particular, if the described multi-dimensional encrypting and decrypting methods are symmetric, it will be apparent for a person skilled in the art to find a way how to implement the limitations given by the embodiments related to an encrypting method also for the described multi-dimensional decrypting method. In this respect the terms "symmetric encryption" and "symmetric decryption" mean that both for encrypting and for decrypting the identical key is used.

According to an embodiment of the invention the decrypting each bit of the portion of the dataset comprises performing an XOR-operation between a bit of the dataset and a corresponding bit of the combined first and second keystream.

As has already been described above with reference to the corresponding embodiment of the encrypting method this may provide the advantage the described multi-dimensional decryption method may be not only symmetrical with respect to combination of the first keystream and the second keystream. The encryption method can also be symmetric with respect to the decryption of each bit of the encrypted dataset. Again, "symmetric encryption" and "symmetric decryption" mean that both for encrypting and for decrypting the identical key is used.

According to a further aspect of the invention, there is provided a method for temporarily storing at least a portion of a dataset into a memory, wherein the dataset has at least two dimensions. The provided method comprises (a) encrypting the portion of the dataset by carrying out the multi-dimensional encrypting method described above, (b) storing the encrypted portion of the dataset into the memory, (c) reading out the stored encrypted portion of the dataset from the memory, and (d) decrypting the readout encrypted portion of the dataset by carrying out the multi-dimensional decrypting method described above.

This aspect of the invention is based on the idea that by taking advantage of the above described multi-dimensional method, at least a portion of a dataset can be effectively stored temporarily in memories, which are physically not protected or which are only sparse protected against unauthorized attacks. During the storage of the portion of the dataset an attack from an unauthorized person is prevented or at least hampered because in the memory the dataset is available only in encrypted form.

Since the above described multi-dimensional method allows for effectively encrypting a dataset and in particular for effectively decrypting a portion of a multi-dimensional dataset, the whole procedure can be carried out very fast. This provides the opportunity that the described temporarily storing method can be used for instance for multi media devices wherein datasets representing for instance a video content such as a MPEG4 datafile have to be transferred very fast from a secure processor to an comparatively unsecure working memory. The same holds for a data transfer in the opposite direction from a comparatively unsecure working memory to a secure processor. Due to the efficiency of the described encrypting and decrypting methods this can be carried out at least approximately in real time, such that on the one hand a user will take no notice from the encrypting and decrypting and on the other hand security requirements can be fulfilled. Such security requirements are typically given by copyright owners of the media content, who want to prevent an unauthorized copying and distributing of their media content.

According to a further aspect of the invention there is provided a device for handling a dataset having at least two dimensions, in particular a multimedia dataset. The provided device comprises (a) a processing device, and (b) a working memory, which is coupled to the processing unit. Thereby, the processing device is adapted to transfer data to the working memory by carrying out the above described multi-dimensional encrypting method and/or the processing device is adapted to receive data from the working memory by carrying out the above described multi-dimensional decrypting method.

Also this aspect of the invention is based on the idea that by taking advantage of the above described multi-dimensional method, the portion of the dataset can be effectively and securely stored in the working memory of the described data handling device. This may provide the advantage the device may be equipped with a comparatively unsecure memory without making the device as a whole unsecure against hacker attacks.

The described dataset handling device can be for instance a portable or a stationary multimedia device, which can be used for displaying pictures or video data and/or for outputting sound data. The described device may be equipped and/or be connected with an input/output device. The input/output device may comprise for instance a monitor and/or a loudspeaker.

According to an embodiment of the invention, the processing device comprises (a) a first encrypting unit for encrypting and/or decrypting the dataset by using the first keystream and (b) a second encrypting unit for encrypting and/or decrypting the dataset by using the first keystream. This means that the first encrypting unit is adapted for performing the encrypting and/or the decrypting procedure with respect to the first dimension of the memory. Accordingly, the second encrypting unit is adapted for performing the encrypting and/or the decrypting procedure with respect to the second dimension of the memory.

Such a segmentation, wherein separate units are provided for encrypting and decrypting along different dimensions may provide the advantage that the whole multi-dimensional encrypting and decrypting procedure can be carried out very effectively. This means that both encryption and decryption can be carried out comparatively fast.

It has to be mentioned that the described segmentation may be realized by means of a computer program. However, the invention may also be realized by means of one or more specific electronic circuits. Furthermore, the invention may also be realized in a hybrid form, i.e., in an appropriate combination of software modules and hardware modules.

According to a further embodiment of the invention, the dataset handling device further comprises a data input for receiving data. This may provide the advantage that the dataset handling device can be fed with data originating for any external data carrier such as for instance a Digital Versatile Disc (DVD). Thereby, the data may be raw data in an unencrypted format. Further, data originating from a network such as the internet may also be fed into the dataset handling device.

According to a further embodiment of the invention the processing device further comprises a central processing unit, which is adapted to perform a MPEG decoding. This may provide the advantage that video datasets can be handled in an effective manner. Further, since the MPEG standard is widely used for handling video data, the described dataset handling device can used for most video applications, which are on the market.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DESCRIPTION OF EMBODIMENTS

The illustration in the drawing is schematic. It is noted that in different figures, similar or identical elements are provided with reference signs, which are different from the corresponding reference signs only within the first digit.

The subsequent described embodiments of the invention essentially provide a new form of stream cipher. Therefore, in order to facilitate the understanding of these embodiments, there will be given first some background information about known stream cipher encryptions.

Stream ciphers are usually based on linear feedback shift registers and non-linear Boolean components. They are designed to be simple and easy to implement in hardware. Given a key k and an initialization vector IV, a stream of bits is generated from the internal state s of the internal cipher registers.

In the following, f is a stream cipher update function and $s_i$ is the internal register configuration of the stream cipher after a bit i of a plaintext has been encrypted. The cipher of the internal state is updated with each iteration:

$$s_i+1=f(s_i).$$

For current stream ciphers, s is of the order of 150-300 bits. The key k and the initialization vector IV are used to seed the initial state register configuration and the internal register state $s_0$.

A bit $k_i$ of the keystream is entirely determined from a given internal cipher configuration $s_i$ and is generated from the following equation:

$$k_i=g(s_i)$$

Thereby, g is a function representing the keystream generation, which extracts at any one time a bit from the internal state register configuration.

The actual encryption of a bit of plaintext x, is performed by:

$$c_i=x_i+k_i$$

Thereby, "+" represents a bitwise XOR operation. The corresponding decryption is performed by generation of the same keystream $k_i$ and simply performing the XOR operation:

$$x_i=c_i+k_i.$$

If an internal state $s_i$ of a stream cipher $F_k$, which comprises the function f for state update, the function g for generating the keystream and the cipher key k, is known, then the entire keystream from that point can be generated. This is performed by one bit per iteration, which can be described by the following equation:

$$F(s_i)=\{k_i,k_{i+1},k_{i+2},\ldots\}$$

An important property is that a stream cipher is very efficient in encryption and in decryption of a linear stream of data such as a large file that is being downloaded. The encryption and decryption procedure does depend, however, on getting the data bit by bit in the exact right order. This is because the way a particular bit is encrypted depends on the states of the cipher, which states have been adopted in all previous encryptions. Therefore, to skip a part of the data stream, the cipher needs to know all the previous internal configurations and all the cipher states to the point where the decryption starts again. In this respect, a stream cipher decryption significantly differs from a block cipher, which, depending on the exact usage, is capable of decrypting each block of data independently.

As will be apparent from the description below, the multi-dimensional encryption and decryption procedure according to the described embodiment of the invention has the advantage that it can support complex memory access patterns, which are increasingly encountered in multimedia applications. By contrast thereto, neither an encryption and a decryption based on known block ciphers nor an encryption and a decryption based on known stream ciphers can provide this advantage.

Figure 3:
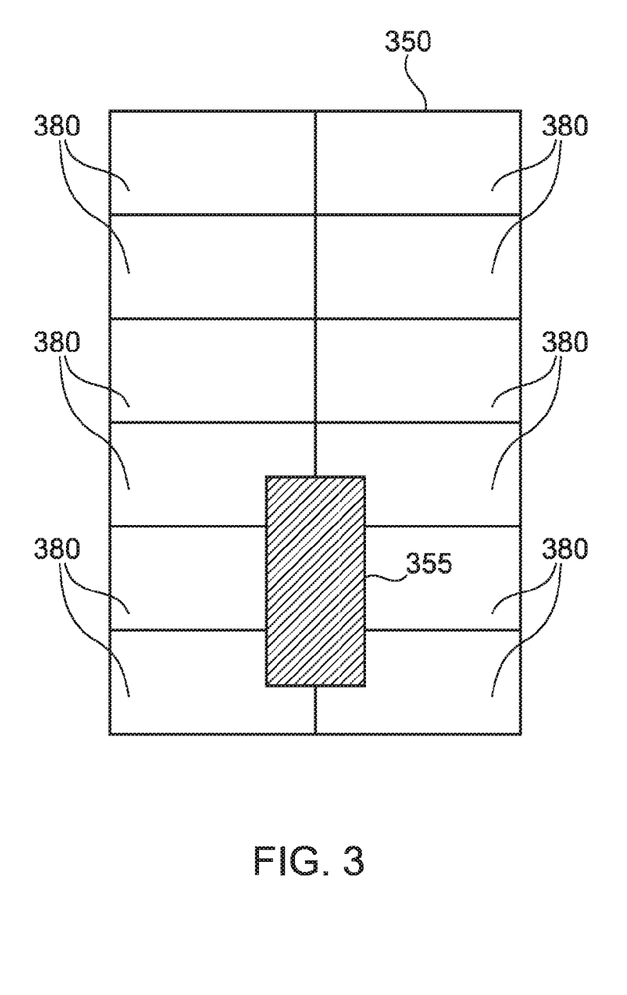
FIG. 3 shows the decryption of an irregular portion of a 2D memory, which data content has been encrypted by using a block cipher.
Figure 4:
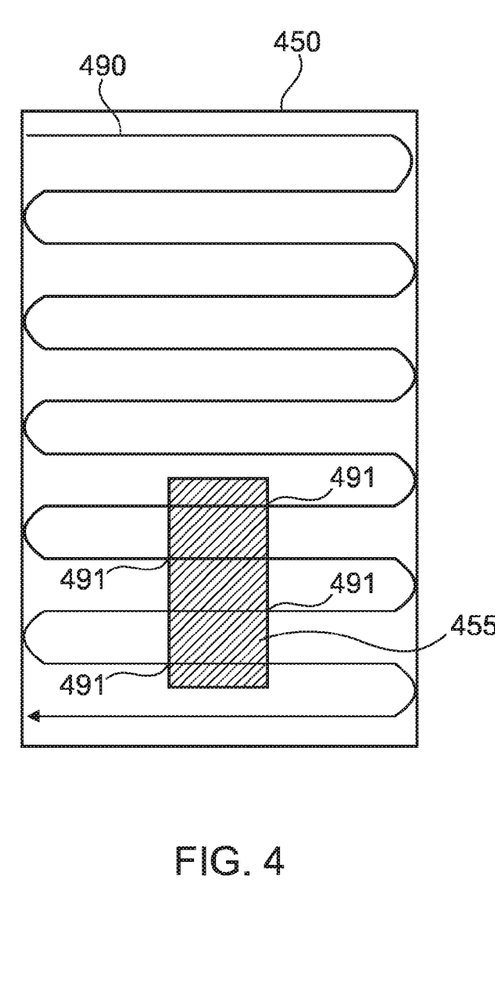
FIG. 4 shows the decryption of an irregular portion of a 2D memory, which data content has been encrypted by using a stream cipher.

In order to illustrate this and in order to improve the understanding of the invention, with reference to FIG. 3, there will be briefly described an example a block cipher based decryption of a block cipher based encrypted video content stored in a two-dimensional (2D) memory, such as a flash memory. With reference to FIG. 4, there will be briefly described, as a further example, a stream cipher based decryption of a stream cipher based encrypted video content stored in a two-dimensional (2D) memory. These examples illustrate how 2D access of data of random size and position is typically performed during a video decompression or graphic generation.

FIG. 3 shows the decryption of an irregular portion 355 of a 2D memory 350, which data content has been encrypted by using a block cipher. Even though the portion 355 of the memory 350 required for decryption may be the same as a single block 380, the portion 355 will be typically not aligned with block boundaries. This implies that the decryption of, in the depicted case, six memory blocks 380 is required. This illustrates a general problem with block ciphers and memory accesses to this type. Although, in principle, memory access using block ciphers is indeed random access, unless the portion 355 of the memory 350 for decryption is exactly aligned along block boundaries, an amount of extra redundant decryption work must be performed. This means that data have to be decrypted, even when data are not needed.

FIG. 4 shows the decryption of an irregular portion 455 of a 2D memory 450, which data content has been encrypted by using a stream cipher 490. In order to decrypt the irregular portion 455 of the memory 450, four entry points 491 in the cipher stream are required. Since stream ciphers typically need to decrypt the data in the exact order as it was encrypted, a data block, which is not needed, cannot be skipped during the decryption procedure. Therefore, when using stream cipher encryption, an amount of extra redundant decryption work must be performed.

In the following, a two-dimensional (2D) encryption and decryption procedure employing a horizontal stream cipher $F_{kx}$ and a vertical stream cipher $F_{ky}$ will be described in more detail. Even though this two-dimensional (2D) encryption and decryption procedure represents a preferred embodiment of the invention, it is pointed out that the invention described with this application is not limited to a 2D cryptographic procedure. The invention can rather also be realized by three or even more different stream ciphers, each cipher representing a dimension of a memory and/or a dataset.

The 2D encryption procedure for effectively encrypting a 2D portion of memory, such as a frame buffer, comprises the following important steps:

In a first step, two separate stream ciphers, a horizontal stream cipher $F_{kx}$ and a vertical stream cipher $F_{ky}$ are generated. Thereby, these stream ciphers can be the same in case different keys are used.

In a second step, a horizontal keystream $F_{kx}(s_i)$ is formed. This horizontal keystream $F_{kx}(s_i)$ is generated by internal states $s_i$ of an internal register configuration.

In a third step, a vertical keystream $F_{ky}(s_j)$ is formed. This vertical keystream $F_{ky}(s)$ is generated by internal states $s_i$ of an internal register configuration.

In a fourth step, for a 2D memory, each bit $x_{ij}$ representing a bit of a plaintext is encrypted by the following logical operation:

$$c_{ij}=x_{ij}+k_{ij}$$

Thereby, $k_{ij}=F_{kx}(s_i)+F_{ky}(s_j)$ and "+" is the logical XOR operation.

This embodiment is characterized by the fact that compared to a one-dimensional stream cipher encryption using a single keystream only (see description above), in the 2D stream cipher encryption the entire 2D memory space is covered by the XOR of a horizontal and a vertical keystream.

A corresponding decryption of an arbitrary rectangular portion of such an encrypted dataset being stored in a 2D memory can be performed with using the knowledge of the internal states $s_i$ of the horizontal keystream and the internal states $s_i$ of the vertical keystream. The decryption can be performed by applying the following logical operation:

$$x_{ij}c_{ij}k_{ij}$$

Although only a single repeated horizontal keystream is used in the horizontal and vertical directions across the 2D memory, the memory space is uniquely covered by the XOR operation of both streams at each memory location. The corresponding logical equation is the following:

$$k_{ij}=F_{kx}(s_i)+F_{ky}(s_i)$$

The described 2D encryption and decryption method may provide the advantage that the whole cryptography requires only internal storage of the internal states $s_i$ and $s_i$ of ciphers for the horizontal keystreams $F_{kx}(s_i)$ and for the vertical keystream $F_{ky}(s_j)$. In case the corresponding key comprises repeated key codes, the required internal storage capacity is a constant regardless of size of the 2D memory.

The described 2D cryptographic procedure further provides the advantage that an effective area and time efficient solution for the so far unsolved problem of an arbitrary access of a portion of a 2D memory within in a larger 2D memory is provided. As compared to previous approaches the provided solution is faster, cheaper and requires less storage capacity.

Figure 1:
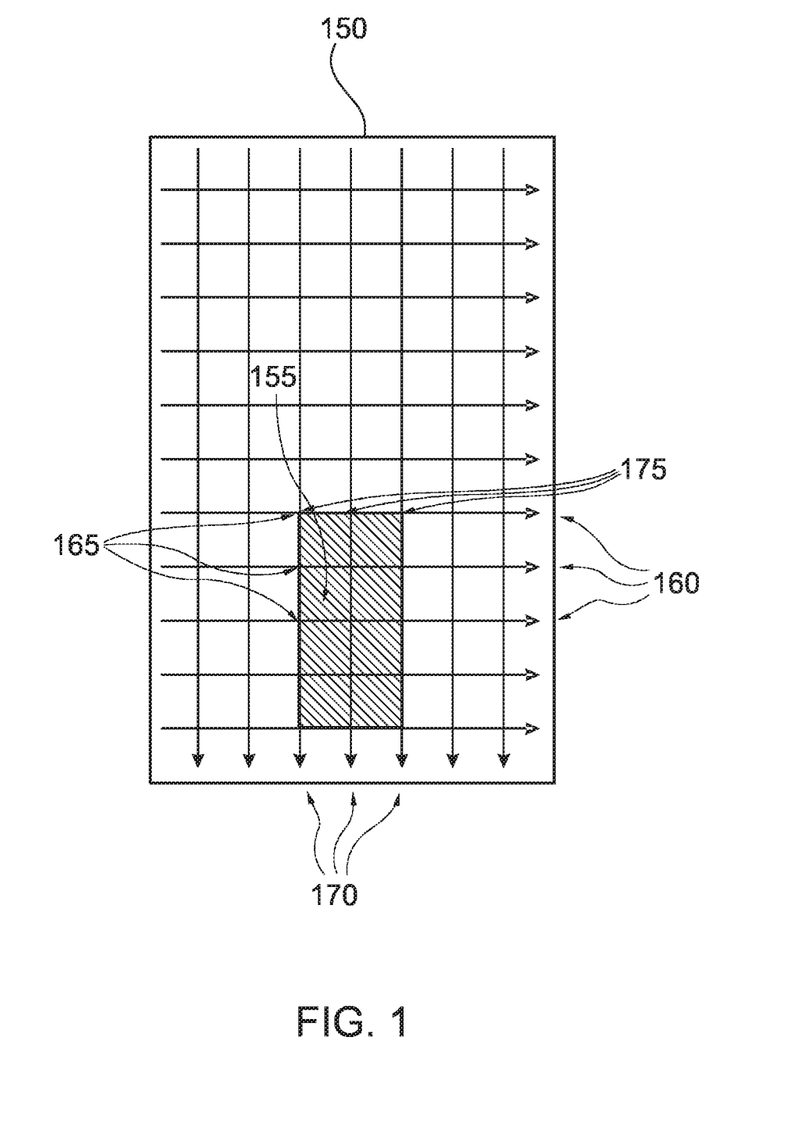
FIG. 1 shows a diagram depicting the decryption of an irregular portion of a 2D memory, wherein the data stored in the 2D memory have been encrypted by performing a sequential XOR operation by means of a horizontal stream cipher and a vertical stream cipher.

FIG. 1 shows a diagram depicting the decryption of an irregular portion 155 of a 2D memory 250. The memory is, for instance, a flash memory 250. The data stored in the 2D memory 250 have been encrypted by performing a sequential XOR operation by means of a horizontal stream cipher $F_{kx}$ 160 and a vertical stream cipher $F_{ky}$ 170. The horizontal keystreams $F_{kx}$ for internal cipher state $s_i$ are denoted with reference sign 165. The vertical keystreams $F_{ky}$ for internal cipher state $s_i$ are denoted with reference sign 175.

As can be seen from FIG. 1, the memory 150 comprises an 11×7 2D memory grid. With a 7 bit horizontal keystream $F_{kx}$ 160, each bit in the horizontal stream is described by a 4 bit internal cipher state $s_i$, wherein i=0 . . . 6. With an 11 bit vertical keystream $F_k$ 170, each bit in the vertical stream is described by a 4 bit internal cipher state $s_j$, wherein j=0 . . . 10. Therefore, in this case only 7×4+11×4=336 bits are required to describe the entire keystream over the 2D memory 150 and only two sections of state information ($s_i$, $s_j$) are necessary in order to describe any rectangular portion 155 of the memory 150.

As can be seen from FIG. 1, the horizontal keystreams $F_{kx}$ 160 and the vertical keystreams $F_{ky}$ 170 are the same across the larger 2D memory 150. An attacker could recover points of the keystreams if the plaintext is known. In this case of using the same keystreams each point in the typically insecure 2D memory 150 is described by the following equation:

$$F_{kx}(s_i)F_{ky}(s_j)=k_{ij}$$

This represents, in fact, i×j linear equations for i+j variables. This means that these portions of the keystream can be recovered by solving these linear equations. Therefore, in order to increase the security of the described 2D cryptographic procedure, one should frequently re-key the stream ciphers. When the key is changed often and the plaintext will, in general, not be known, this scheme provides a high degree of security.

Figure 2:
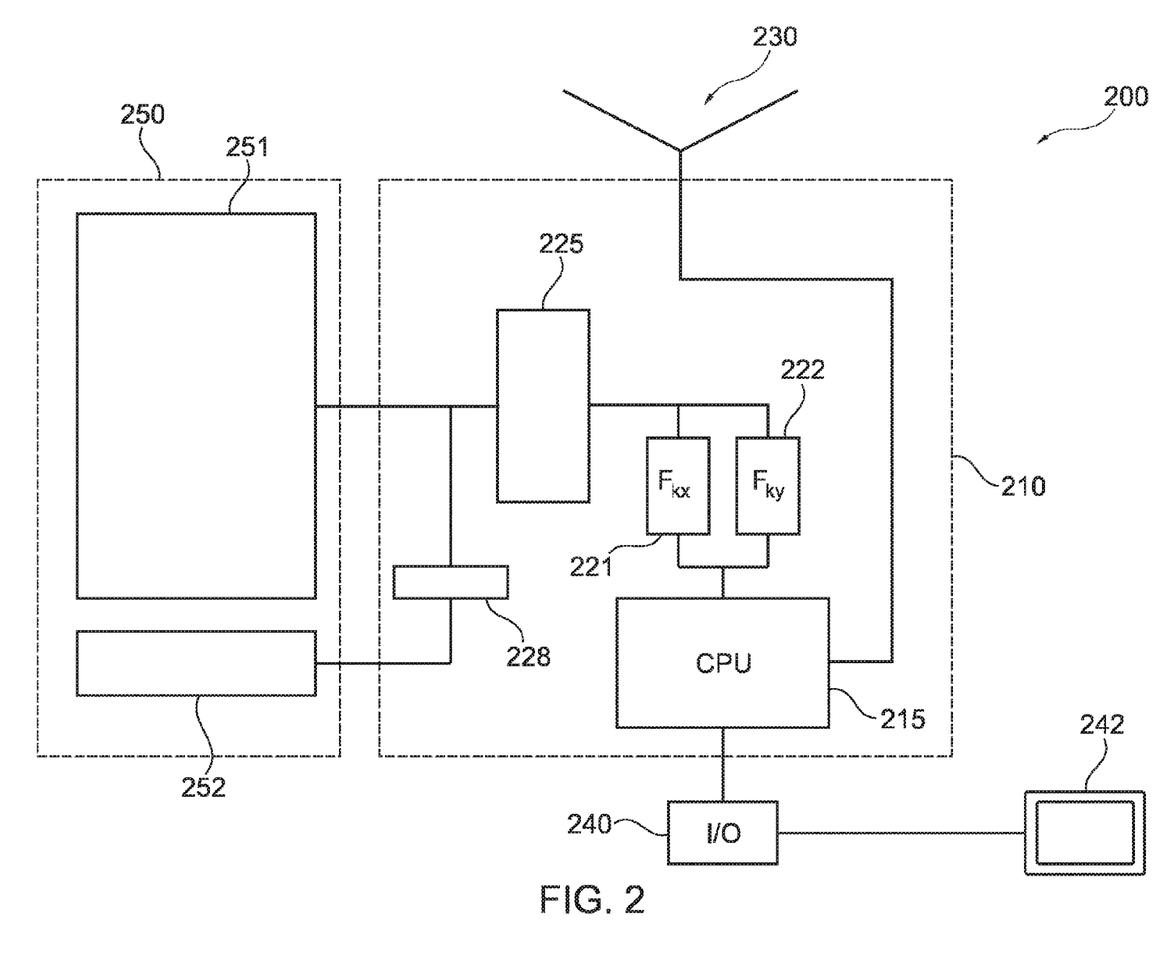
FIG. 2 shows a multimedia device, which is adapted to perform both a data encryption and a data decryption by using a horizontal stream cipher and a vertical stream cipher.

FIG. 2 shows a multimedia device 200 representing an embodiment of the invention. The multimedia device may be a DVD video player 200. The multimedia device 200 comprises a processing device 210 and a working memory 250. The processing device 210 is considered to represent a secure component of the multimedia device 200. The external 2D memory 250 is considered to represent a comparatively unsecure component of the multimedia device 200. The processing device 210 comprises a data input 230, which allows for a loading of video data into the processing device 210. According to the embodiment described here, the video data are raw data from a data carrier such as a DVD. The raw data are plaintext data, which are compressed by a known compression procedure such as MPEG coding.

The processing device 210 further comprises a central processing unit 215, which is adapted for performing an MPEG decoding of data being transferred from the data input 230 to the central processing unit 215.

Further, the processing device 210 comprises a first encrypting unit 221 and a second encrypting unit 222. In combination, these encrypting units 221, 222 are adapted to perform a two-dimensional decrypting of the decompressed data being provided by the central processing unit 215.

Further, the processing device 210 comprises a memory subsystem control unit 225 and a masking unit 228. The memory subsystem control unit 225 is used for controlling the 2D encryption procedure. In particular, the memory subsystem control unit 225 decides which data portions have to remain within the secure processing device 210 and which data portions are allowed to leave the secure processing device 210. The masking unit 228 is used for encrypting the horizontal and the vertical stream ciphers. This ensures that these stream ciphers can be stored externally in a memory portion 252 of the 2D working memory 250, only in an encrypted form. The encrypted video data are stored in a 2D video frame buffer 251, also representing a part of the external and comparatively unsecure 2D working memory 250.

The multimedia device 200 further comprises an Input/Output unit 240 and a monitor 242. The Input/Output unit 240 is adapted for providing information about the operating condition of the multimedia device 200 to a user and/or for receiving control commands from the user. The monitor 242, which is coupled to the Input/Output unit 240, is used for displaying the desired video content.

In the following, the operation of the multimedia device 200 will be described:

A) Initially the Digital Rights Management (DRM) protected content is loaded from a data carrier and the DRM protection is removed. This step is not shown in diagram.

B) The 2D video frame buffer 251 will then be filled with [[a]] video content. However, before the video content is stored in the buffer 251, the video content is encrypted using the 2D encrypting method described in detail in the previous section of this application.

C) At the same time the state data for the horizontal and vertical stream ciphers ($s_i$, $s_j$) are also generated. Prior to storage of the video content in the external memory 251, the video content is masked by means of an XOR operation with a random value.

D) When a particular 2D portion of the video data stored in the memory 251 is required for media decrypting, this portion is retrieved from the frame buffer 251. At the same time the appropriate $s_i$ and $s_j$ data are also obtained and the mask is removed.

E) This $s_i$ and $s_j$ data are then decrypted using the stream ciphers $F_{kx}$ and $F_{ky}$ as previously discussed and used before by the media decoder.

F) Any update information is then written to the frame buffer 251 going through the same encryption process.

G) Occasionally the frame buffer 251 will be completely refilled. Before this is performed both the horizontal and vertical stream ciphers and the masking value are re-keyed. This may improve the security significantly.

The above described invention is for instance applicable to processors, which require a fast and an efficient encryption and decryption of 2D portions of memory. This holds, for instance, for many processors, which process encoded video content, such as MPEG4 compressed video data.

Compared to known procedures, the described 2D dimensional cryptography method may provide the following advantages:

Faster and more efficient encryption and decryption than block cipher cryptography.

Less storage requirements and more efficient than using a single stream cipher.

With only low hardware requirements and providing frequent rekeying an acceptable security level can be provided.

The so far unsolved problem of effective 2D random memory access and decryption is solved.

It should be noted that the term "comprising" does not exclude other elements or steps and the term "a" or the term "an" does not exclude a plurality. Also, elements described in association with different embodiments may be combined. It should also be noted that reference signs in the claims should not be construed as limiting the scope of the claims.

The invention claimed is:

1. A method for encrypting at least a portion of a dataset being stored in a memory, wherein the dataset has at least two dimensions, the method comprising:
    forming a first keystream assigned to a first dimension of the dataset, wherein a length of the first keystream equals a length of the dataset along a first dimension;
    forming a second keystream assigned to a second dimension of the dataset, wherein a length of the second keystream equals a length of the dataset along a second dimension; and
    encrypting each data packet of the portion of the dataset by using a combination of the first keystream and the second keystream.

2. The method according to claim 1, further comprising:
    generating the first keystream based on a first stream cipher; and
    generating the second keystream based on a second stream cipher.

3. The method according to claim 2, wherein the first stream cipher and the second stream cipher are identical, a first key is used for generating the first keystream, and a second key, different from the first key, is used for generating the second keystream.

4. The method according to claim 1, wherein at least one of the first keystream and the second keystream comprises a recurring code.

5. The method according to claim 1, wherein the first keystream and the second keystream depend on each other.

6. The method according to claim 1, wherein the combination of the first keystream and the second keystream comprises an XOR-operation between a bit of the first keystream and a bit of the second keystream.

7. The method according to claim 1, wherein the data packet has a single bit and encrypting each bit of the portion of the dataset comprises performing an XOR-operation between a bit of the dataset and a corresponding bit of the combined first and second keystream.

8. The method according to claim 1, wherein the data packet has a size greater than a single bit.

9. A method for decrypting at least a portion of a dataset being stored in a memory, wherein the dataset has at least two dimensions, the method comprising:
   forming a first keystream assigned to a first dimension of the dataset, wherein a length of the first keystream equals a length of the dataset along a first dimension;
   forming a second keystream assigned to a second dimension of the dataset, wherein a length of the second keystream equals a length of the dataset along a second dimension; and
   decrypting each bit of the portion of the dataset by using a combination of the first keystream and the second keystream.

10. The method according to claim 9, wherein decrypting each bit of the portion of the dataset comprises performing an XOR-operation between a bit of the dataset and a corresponding bit of the combined first and second keystream.

11. A device for handling a dataset having at least two dimensions, the device comprising
   a processing device; and
   a working memory, which is coupled to the processing device, wherein the processing device is adapted to transfer data to the working memory, a length of a first keystream equals a length of the dataset along a first dimension, and a length of a second keystream equals a length of the dataset along a second dimension.

12. The device according claim 11, wherein the processing device comprises:
   a first encrypting unit; and
   a second encrypting unit.

13. The device according to claim 11, further comprising:
   a data input for receiving data.

14. The device according to claim 11, wherein the processing device further comprises:
   a central processing unit, which is adapted to perform a MPEG decoding.

15. The method of claim 1, wherein the dataset represents a temporal sequence of 2D images.

16. The method of claim 1, wherein the dataset represents a temporal sequence of 3D images.

17. The method of claim 1, further comprising:
   performing encryption along alternating directions.

18. The method of claim 1, wherein the dataset stored in the memory is available only in encrypted form.

19. The device of claim 11, wherein the processing device further comprises:
   a memory subsystem control device configured for deciding which data portions remain within the processing device.

20. The device of claim 11, wherein the processing device further comprises:
   a masking device configured for encrypting horizontal and vertical stream ciphers.

* * * * *